(12) United States Patent
Kiyohiro

(10) Patent No.: US 8,785,075 B2
(45) Date of Patent: Jul. 22, 2014

(54) FUEL CELL HAVING A STACKED ELECTROLYTE ELECTRODE ASSEMBLY

(75) Inventor: Yukihiko Kiyohiro, Asaka (JP)

(73) Assignee: Honda Motor Co., Ltd., Tokyo (JP)

( * ) Notice: Subject to any disclaimer, the term of this patent is extended or adjusted under 35 U.S.C. 154(b) by 834 days.

(21) Appl. No.: 12/377,242

(22) PCT Filed: Jul. 18, 2007

(86) PCT No.: PCT/JP2007/064530
§ 371 (c)(1),
(2), (4) Date: Feb. 11, 2009

(87) PCT Pub. No.: WO2008/020533
PCT Pub. Date: Feb. 21, 2008

(65) Prior Publication Data
US 2010/0178593 A1 Jul. 15, 2010

(30) Foreign Application Priority Data
Aug. 15, 2006 (JP) .................................. 2006-221618

(51) Int. Cl.
*H01M 8/04* (2006.01)
*H01M 8/02* (2006.01)
*H01M 8/24* (2006.01)

(52) U.S. Cl.
CPC .......... *H01M 8/0247* (2013.01); *H01M 8/0258* (2013.01); *H01M 8/04089* (2013.01); *H01M 8/04201* (2013.01); *H01M 8/249* (2013.01); *H01M 8/021* (2013.01); *H01M 8/0213* (2013.01)
USPC ............ 429/514; 429/513; 429/452; 429/454

(58) Field of Classification Search
CPC ............ H01M 8/0236; H01M 8/0247; H01M 8/0258; H01M 8/0265
See application file for complete search history.

(56) References Cited

U.S. PATENT DOCUMENTS 6,410,178 B1  6/2002  Matsukawa et al.
7,531,262 B1 *  5/2009  Simpson et al. .............. 429/450
(Continued)

FOREIGN PATENT DOCUMENTS

EP       1422774 A1    5/2004
JP       10-172594     6/1998
(Continued)

OTHER PUBLICATIONS

Machine translation for Hayashi et al., JP 2005-203263 A.*
(Continued)

*Primary Examiner* — Edu E Enin-Okut
(74) *Attorney, Agent, or Firm* — Nelson Mullins Riley & Scarborough LLP; Anthony A. Laurentano

(57) ABSTRACT

A separator of a fuel cell includes sandwiching sections for sandwiching electrolyte electrode assemblies, first bridges each having a fuel gas supply channel, and a fuel gas supply unit. A fuel gas supply passage extends through the fuel gas supply unit in a stacking direction. Each of the sandwiching sections has a fuel gas inlet for supplying a fuel gas to a fuel gas channel, a fuel gas discharge channel for discharging the fuel gas consumed in the fuel gas channel, and a circular arc wall contacting an anode, and prevents the fuel gas from flowing straight from the fuel gas inlet to the fuel gas discharge channel.

11 Claims, 19 Drawing Sheets

(56) References Cited

U.S. PATENT DOCUMENTS

| | | |
|---|---|---|
| 7,601,453 B2 | 10/2009 | Tsunoda et al. |
| 2004/0234836 A1 * | 11/2004 | Orishima et al. ............... 429/38 |
| 2005/0118491 A1 | 6/2005 | Ramsey et al. |
| 2005/0136316 A1 * | 6/2005 | Tsunoda et al. ............... 429/37 |
| 2005/0142424 A1 * | 6/2005 | Homma et al. ............... 429/38 |

FOREIGN PATENT DOCUMENTS

| | | | |
|---|---|---|---|
| JP | 11-185778 | 7/1999 | |
| JP | 11-354141 | 12/1999 | |
| JP | 2004-207067 | 7/2004 | |
| JP | 2005-183084 | 7/2005 | |
| JP | 2005203263 A * | 7/2005 | .............. H01M 8/04 |
| JP | 2005-216642 | 8/2005 | |
| JP | 2006-107968 | 4/2006 | |
| WO | WO-2007/077723 A1 | 7/2007 | |
| WO | WO-2007/077724 A1 | 7/2007 | |
| WO | WO 2007077724 A1 * | 7/2007 | .............. H01M 8/04 |

OTHER PUBLICATIONS

International Search Report for Application No. PCT/JP2007/064530, dated Jan. 16, 2008.

Japanese Office Action for Application No. 2006-221618, 4 pages, dated Apr. 24, 2012.

Japanese Office Action for Application No. 2006-221618, 4 pages, dated Jul. 10, 2012.

* cited by examiner

FUEL CELL HAVING A STACKED ELECTROLYTE ELECTRODE ASSEMBLY

RELATED APPLICATIONS

This application is a 35 U.S.C. 371 national stage filing of International Application No. PCT/JP2007/064530, filed on Jul. 18, 2007, which claims priority to Japan Patent Application No. 2006-221618 filed on Aug. 15, 2006 in Japan. The contents of the aforementioned applications are hereby incorporated by reference.

TECHNICAL FIELD

The present invention relates to a fuel cell formed by stacking an electrolyte electrode assembly and separators. The electrolyte electrode assembly includes an anode, a cathode, and an electrolyte interposed between the anode and the cathode.

BACKGROUND ART

Typically, a solid oxide fuel cell (SOFC) employs an electrolyte of ion-conductive solid oxide such as stabilized zirconia. The electrolyte is interposed between an anode and a cathode to form an electrolyte electrode assembly. The electrolyte electrode assembly is interposed between separators (bipolar plates). In use, generally, predetermined numbers of the electrolyte electrode assemblies and the separators are stacked together to form a fuel cell stack.

In the fuel cell, in order to supply a fuel gas such as a hydrogen-containing gas and an oxygen-containing gas such as the air to the anode and the cathode of the electrolyte electrode assembly, a fuel gas channel and an oxygen-containing gas channel are formed along surfaces of the separator. The fuel cell stack may adopt internal manifold structure where a fuel gas supply unit and an oxygen-containing gas supply unit extend in the stacking direction for distributing the fuel gas and the oxygen-containing gas to each fuel gas channel and each oxygen-containing gas channel.

For example, in a flat plate type solid oxide fuel cell disclosed in Japanese Laid-Open Patent Publication No. 10-172594, unit cells (not shown) and separators 1 are provided alternately, and as shown in FIG. 19, gas supply holes 2a, 3a and gas discharge holes 2b, 3b extend through the separator 1 in the stacking direction at four corners thereof, and a plurality of gas flow grooves 4a and ridges 4b in a plurality of rows are arranged alternately along the surface of the separator 1.

The gas flow grooves 4a are connected to the gas supply hole 2a and the gas discharge hole 2b through triangular recesses 5a, 5b. A throttle section 6 and blocks 7 are provided in a gas inlet section of the triangular recess 5a, near the gas supply hole 2a, as means for limiting the flow rate of the gas. The throttle section 6 and the blocks 7 function to increase the pressure loss of the gas flowing from the gas supply hole 2a to the gas inlet section for uniform gas distribution.

Further, at opposite ends of the gas flow grooves 4a, a shallow gas flow inlet 8a and a shallow gas flow outlet 8b are provided for causing a pressure loss in the gas flow.

However, in Japanese Laid-Open Patent Publication No. 10-172594, in the gas flow grooves 4a where actual power generation is performed, it is not possible to regulate the flow of the reactant gas. Therefore, even if it is possible to cause the pressure loss in the gas flow at the inlet of the gas flow grooves 4a, for example, due to the factors such as the shape of the separator 1, the reactant gas may not flow suitably along the gas flow grooves 4a.

DISCLOSURE OF INVENTION

The present invention solves the above problems, and an object of the present invention is to provide a fuel cell which makes it possible to suitably and reliably supply a fuel gas along an electrode surface of an anode, and improve the fuel gas utilization ratio by consuming the fuel gas efficiently in power generation reaction.

The present invention relates to a fuel cell formed by stacking an electrolyte electrode assembly and separators. The electrolyte electrode assembly comprises an anode, a cathode, and an electrolyte interposed between the anode and the cathode.

The electrolyte electrode assembly is sandwiched between the separators. Each of the separators comprises a sandwiching section having a fuel gas channel for supplying a fuel gas along an electrode surface of the anode and an oxygen-containing gas channel for supplying an oxygen-containing gas along an electrode surface of the cathode separately, a bridge connected to the sandwiching section, and having a reactant gas supply channel for supplying the fuel gas to the fuel gas channel or supplying the oxygen-containing gas to the oxygen-containing gas channel, and a reactant gas supply unit connected to the bridge, a reactant gas supply passage for supplying the fuel gas or the oxygen-containing gas to the reactant gas supply channel, the reactant gas supply passage extending through the reactant gas supply unit in a stacking direction.

A fuel gas inlet for supplying the fuel gas to the fuel gas channel, a fuel gas discharge channel for discharging the fuel gas after consumption in the fuel gas channel, and a detour path forming wall which contacts the anode, for preventing the fuel gas from flowing straight from the fuel gas inlet to the fuel gas discharge channel are provided in the sandwiching section.

According to the present invention, the fuel gas supplied from the fuel gas inlet to the fuel gas channel is blocked by the detour path forming wall. Therefore, the fuel gas does not flow straight from the fuel gas inlet to the fuel gas discharge channel. Accordingly, the fuel gas flows around in the fuel gas channel, and flows along the electrode surface of the anode for a long period of time. Thus, it is possible to utilize the fuel gas effectively in the power generation reaction, and improvement in the fuel utilization ratio is achieved.

BEST MODE FOR CARRYING OUT THE INVENTION

Figure 1:
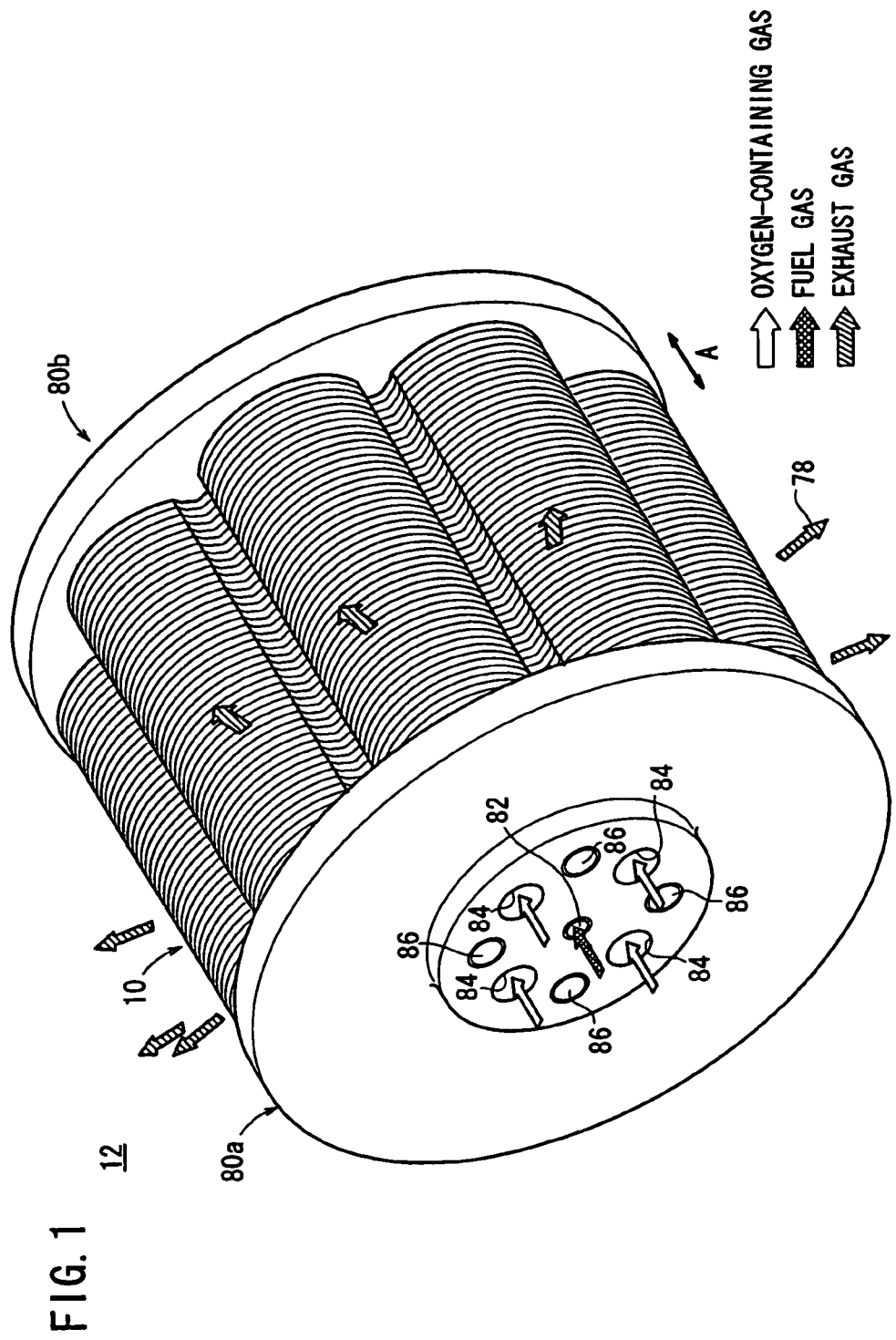
FIG. 1 is a perspective view schematically showing a fuel cell stack formed by stacking fuel cells according to a first embodiment of the present invention.

FIG. 1 is a perspective view schematically showing a fuel cell stack 12 formed by stacking fuel cells 10 according to a first embodiment of the present invention in a direction indicated by an arrow A.

Figure 2:
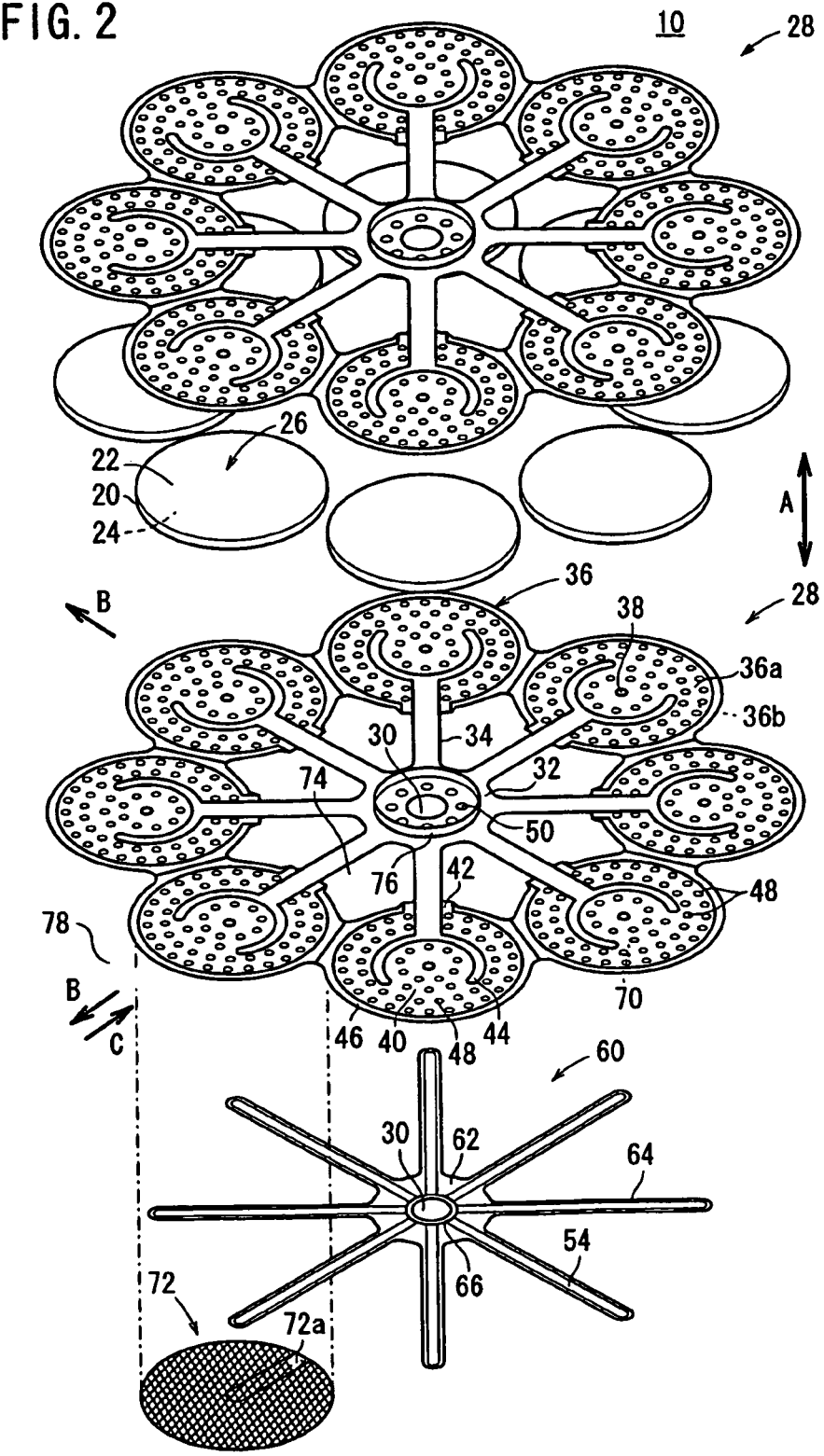
FIG. 2 is an exploded perspective view showing the fuel cell.
Figure 3:
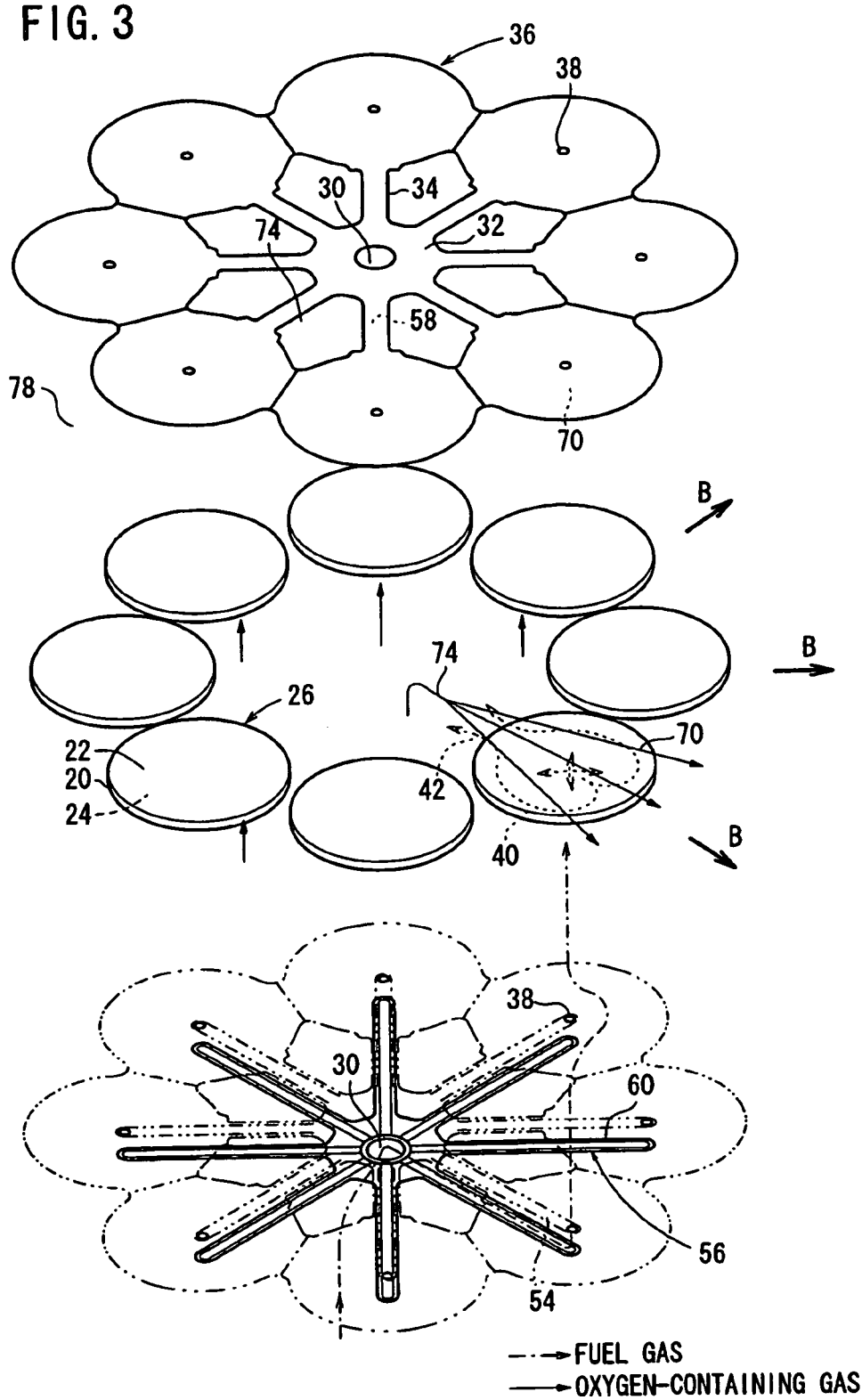
FIG. 3 is a partial exploded perspective view showing gas flows in the fuel cell.

The fuel cell stack 12 is used in various applications, including stationary and mobile applications. For example, the fuel cell stack 12 is mounted on a vehicle. The fuel cell 10 is a solid oxide fuel cell (SOFC). As shown in FIGS. 2 and 3, the fuel cell 10 includes electrolyte electrode assemblies 26. Each of the electrolyte electrode assemblies 26 includes a cathode 22, an anode 24, and an electrolyte (electrolyte plate) 20 interposed between the cathode 22 and the anode 24. For example, the electrolyte 20 is made of ion-conductive solid oxide such as stabilized zirconia. The electrolyte electrode assembly 26 is a thin plate having a circular disk shape. A barrier layer (not shown) is provided at least at the outer circumferential edge of the electrolyte electrode assembly 26 for preventing the entry or discharge of the oxygen-containing gas and the fuel gas.

A plurality of, e.g., eight electrolyte electrode assemblies 26 are sandwiched between a pair of separators 28 to form the fuel cell 10. The eight electrolyte electrode assemblies 26 are aligned along a virtual circle concentric with a fuel gas supply passage (reactant gas supply passage) 30 extending through the center of the separators 28.

As shown in FIG. 2, for example, each of the separators 28 comprises a single metal plate of, e.g., stainless alloy or a carbon plate. The separator 28 has a fuel gas supply unit (reactant gas supply unit) 32. The fuel gas supply passage 30 extends through the center of the fuel gas supply unit 32. The fuel gas supply unit 32 is integral through a plurality of first bridges 34 with sandwiching sections 36 each having a circular disk shape with a relatively large diameter. The first bridges 34 extend radially outwardly from the fuel gas supply unit 32 at equal angles (intervals). The distances between the center of the fuel gas supply unit 32 and the centers of the sandwiching sections 36 are the same.

The sandwiching sections 36 and the electrolyte electrode assemblies 26 have the same size. A fuel gas inlet 38 for supplying the fuel gas is provided, e.g., at the center of the sandwiching section 36, or at a position deviated toward the upstream side of the center of the sandwiching section 36 in the flow direction of the oxygen-containing gas.

Each of the sandwiching sections 36 has a fuel gas channel 40 on a surface 36a which contacts the anode 24, for supplying a fuel gas along an electrode surface of the anode 24. Further, a fuel gas discharge channel 42 for discharging the fuel gas consumed in the fuel gas channel 40 and a circular arc wall 44 forming a detour path to prevent the fuel gas from flowing straight from the fuel gas inlet 38 to the fuel gas discharge channel 42 are provided on the surface 36a of the sandwiching section 36.

The circular arc wall 44 includes a substantially horseshoe shape bifurcated from the end of the first bridge 34. The fuel gas inlet 38 is provided at a position surrounded by the circular arc wall 44, and the fuel gas discharge channel 42 is provided at a proximal end of the circular arc wall 44, near the first bridge 34. On the surface 36a, an outer annular protrusion 46 and a plurality of projections 48 are provided. The outer annular protrusion 46 protrudes from the surface 36a, on the side of the fuel gas channel 40 and contacts the outer edge of the anode 24, and the projections 48 protrude from the surface 36a and contact the anode 24.

The protrusion 46 has a substantially ring shape with partial cutaway at a position corresponding to the fuel gas discharge channel 42. The projections 48 are made of solid portions formed by, e.g., etching, or hollow portions formed by pressure forming. The cross sectional shape of the projection 48 may take various shapes such as a rectangular shape, a circular shape, an oval shape, an ellipse shape, a triangular shape or a square shape. The position and density of the projection 48 can be changed arbitrarily depending on the flow state of the fuel gas or the like. The other projections as described below have the same structure as the projection 48.

The heights of the circular arc wall 44, the protrusion 46, and the projections 48 are determined such that the pressure loss of the fuel gas in the fuel gas channel 40 becomes smaller than the pressure loss of the fuel gas in the fuel gas supply unit 32.

Figure 4:
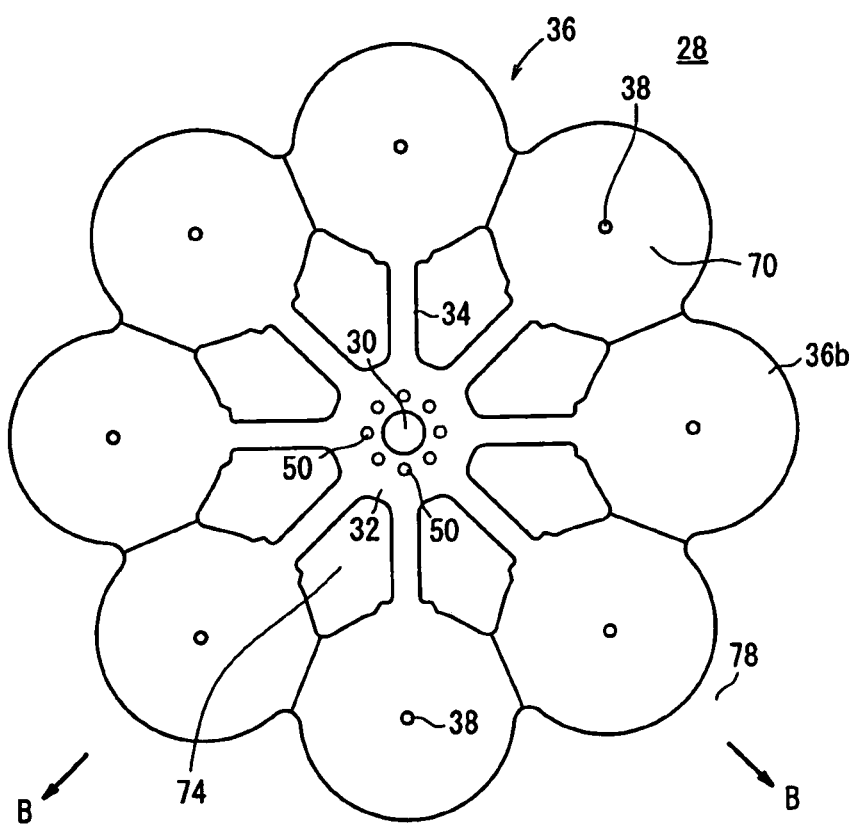
FIG. 4 is a view showing a separator.

As shown in FIG. 4, each of the sandwiching sections 36 has a substantially planar surface 36b which contacts the cathode 22. As shown in FIGS. 2 and 4, a plurality of fuel gas orifices 50 are formed around the fuel gas supply passage 30 in the fuel gas supply unit 32. The diameter of the fuel gas orifice 50 is smaller than the diameter of the fuel gas inlet 38.

As shown in FIG. 2, a channel member 60 is fixed to a surface of the separator 28 facing the cathode 22, e.g., by brazing, diffusion bonding, or laser welding. The channel member 60 has a planar shape. The fuel gas supply passage 30 extends through the fuel gas supply unit 62 at the center of the channel member 60. Eight second bridges 64 extend radially from the fuel gas supply unit 62. Each of the second bridges 64 is fixed to the separator 28 from the first bridge 34 to the surface 36b of the sandwiching section 36 to cover the fuel gas inlet 38 (see FIG. 5).

From the fuel gas supply unit 62 to the second bridge 64, a fuel gas supply channel 54 connecting the fuel gas supply passage 30 to the fuel gas inlet 38 is formed. For example, the fuel gas supply channel 54 is formed by, e.g., etching. In the fuel gas supply unit 62, a ring shaped protrusion 66 is formed around the fuel gas supply passage 30. The protrusion 66 seals the fuel gas supply passage 30 from the fuel gas supply channel 54.

A deformable elastic channel unit such as an electrically conductive mesh member 72 is provided on a surface 36b of the sandwiching section 36. The electrically conductive mesh member 72 forms an oxygen-containing gas channel 70 for supplying an oxygen-containing gas along an electrode surface of the cathode 22, and tightly contacts the cathode 22.

For example, the mesh member 72 is made of a wire rod material such as stainless steel (SUS material), and has a circular disk shape. The thickness of the mesh member 72 is dimensioned such that, when a load in a stacking direction indicated by an arrow A is applied to the mesh member 72, the mesh member 72 is deformed elastically desirably to directly contact the surface 36b of the sandwiching section 36. The mesh member 72 has a cutout 72a for providing a space for the channel member 60 (see FIGS. 2 and 5).

Figure 5:
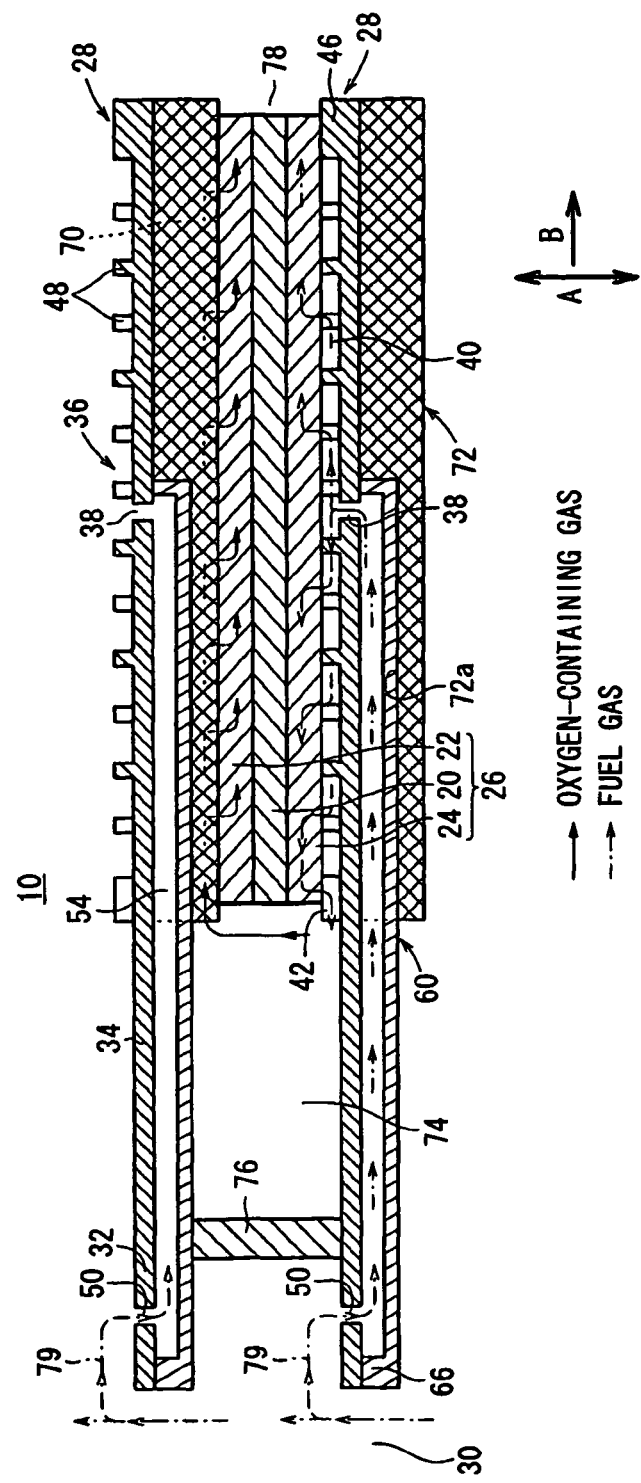
FIG. 5 is a cross sectional view schematically showing operation of the fuel cell.

As shown in FIG. 5, the oxygen-containing gas channel 70 provided in the mesh member 72 is connected to the oxygen-containing gas supply passage (reactant gas supply passage) 74 for supplying the oxygen-containing gas from a space between an inner circumferential edge of the electrolyte electrode assembly 26 and an inner circumferential edge of the sandwiching section 36 in a direction indicated by an arrow B. The oxygen-containing supply passage 74 extends inside the sandwiching sections 36 in the stacking direction indicated by the arrow A, between the respective first bridges 34.

An insulating seal 76 for sealing the fuel gas supply passage 30 is provided between the separators 28, around the fuel gas orifices 50. For example, the insulating seal 76 is made of mica material, or ceramic material. The insulating seal 76 seals the fuel gas supply passage 30 from the electrolyte electrode assemblies 26. The fuel gas orifices 50 are provided between the protrusion 66 and the insulating seal 76.

An exhaust gas channel 78 is provided outside (around) the sandwiching sections 36 of the fuel cells 10. As shown in FIG. 5, when the fuel cells 10 are stacked together, a branch channel 79 is formed between the separators 28. The branch channel 79 is branched from the fuel gas supply passage 30 to extend along the surfaces of the separators 28 in the direction indicated by the arrow B. The branch channel 79 and the fuel gas supply channel 54 are connected by the fuel gas orifices 50 formed in the stacking direction indicated by the arrow A.

As shown in FIG. 1, the fuel cell stack 12 includes substantially circular end plates 80a, 80b each having a circular disk shape at opposite ends of the fuel cells 10 in the stacking direction thereof. At the center of the end plate 80a, a hole 82 corresponding to the fuel gas supply passage 30 is formed, and a plurality of holes 84 are formed around the hole 82, corresponding to the spaces of the oxygen-containing gas supply passage 74. The components between the end plates 80a, 80b are tightened together by bolts (not shown) screwed into the screw holes 86.

Next, operation of the fuel cell stack 12 will be described.

In assembling the fuel cell stack 12, firstly, as shown in FIG. 2, the channel member 60 is joined to a surface of the separator 28 facing the cathode 22. Thus, the fuel gas supply channel 54 connected to the fuel gas supply passage 30 is formed between the separator 28 and the channel member 60. The fuel gas supply channel 54 is connected to the fuel gas channel 40 through the fuel gas inlet 38 (see FIG. 5).

The protrusion 66 of the channel member 60 is fixed to the fuel gas supply unit 32 of the separator 28 to prevent the fuel gas supply passage 30 from being directly connected to the fuel gas supply channel 54. That is, the fuel gas supply passage 30 is connected only to the fuel gas supply channel 54 through the fuel gas orifices 50.

Further, the ring shaped insulating seal 76 is provided between the separators 28 around the fuel gas supply passage 30. In the structure, the fuel gas supply passage 30 is sealed from the electrolyte electrode assemblies 26, and the fuel gas supply passage 30 is connected to the fuel gas supply channel 54. The eight electrolyte electrode assemblies 26 are sandwiched between the separators 28 to form the fuel cell 10.

As shown in FIGS. 3 and 4, the electrolyte electrode assemblies 26 are provided between the surfaces 36a, 36b of the separators 28 facing each other. The fuel gas inlet 38 is provided at substantially the center of each of the anodes 24. The mesh member 72 is interposed between the surface 36b of the separator 28 and the electrolyte electrode assembly 26. The channel member 60 is provided in the cutout 72a of the mesh member 72. A plurality of the fuel cells 10 are stacked in the direction indicated by the arrow A, and end plates 80a, 80b are provided at opposite ends in the stacking direction to form the fuel cell stack 12.

Then, in the fuel cell stack 12, as shown in FIG. 1, the fuel gas (hydrogen-containing gas) is supplied from the hole 82 of the end plate 80a to the fuel gas supply passage 30, and the oxygen-containing gas (hereinafter also referred to as the air) is supplied from the holes 84 of the end plate 80a to the oxygen-containing gas supply passage 74.

As shown in FIG. 5, the fuel gas flows along the fuel gas supply passage 30 of the fuel cell stack 12 in the direction indicated by the arrow A, and is supplied to the branch channel 79 in each of the fuel cells 10. Thus, the fuel gas flowing in the stacking direction is branched toward the direction along the separator surfaces in the direction indicated by the arrow B. Then, the fuel gas flows through the fuel gas orifices 50, and temporarily flows in the stacking direction. Then, the fuel gas flows along the separator surfaces along the fuel gas supply channel 54 connected to the fuel gas orifices 50.

The fuel gas flows from the fuel gas supply channel 54 to the fuel gas channel 40 through the fuel gas inlet 38 formed in the sandwiching section 36. The fuel gas inlet 38 is provided at a position corresponding to substantially the central position of the anode 24 of each of the electrolyte electrode assemblies 26. Thus, the fuel gas is supplied from the fuel gas inlet 38 to the substantially center of the anode 24. The fuel gas flows along the fuel gas channel 40 toward the outer circumferential region of the anode 24.

In the first embodiment, as shown in FIG. 2, a circular arc wall 44 bifurcated from the end of the first bridge 34 is provided on the surface 36a of the sandwiching section 36 of the separator 28, in the path connecting the fuel gas inlet 38 and the fuel gas discharge channel 42. The circular arc wall 44 contacts the anode 24 of the electrolyte electrode assembly 26.

In the structure, the fuel gas supplied from the fuel gas inlet 38 to the fuel gas channel 40 is blocked by the circular arc wall 44. Thus, the fuel gas does not flow straight from the fuel gas inlet 38 to the fuel gas discharge channel 42. The fuel gas flows around in the fuel gas channel 40, over the long distance along the anode 24. That is, the fuel gas flows along the anode 24 over a long period of time, and the fuel gas can be consumed effectively in the power generation reaction. Accordingly, the fuel gas utilization ratio is improved effectively.

In particular, the diameter of the fuel gas inlet 38 is larger than the diameter of the fuel gas orifice 50 provided in the fuel gas supply unit 32, and the heights of the circular arc wall 44, the projections 48, and the protrusion 46 are determined such that the pressure loss of the fuel gas in the fuel gas channel 40 becomes smaller than the pressure loss of the fuel gas in the fuel gas supply unit 32.

Since the pressure loss of the fuel gas in the fuel gas supply unit 32 is large, it is possible to supply the fuel gas equally to each of the sandwiching sections 36. Further, it is possible to increase the size of the fuel gas inlet 38, reduce the number of processes required for fabricating the fuel gas inlet 38, and prevent clogging in the fuel gas inlet 38 advantageously.

Further, in general, the dimensional error of the electrolyte electrode assemblies 26 sandwiched between the adjacent sandwiching sections 36, or the fabrication error in the circular arc wall 44, the projections 48, and the protrusion 46 causes the uneven pressure loss of the fuel gas in each of the sandwiching sections 36. Therefore, uniform distribution of the fuel gas becomes difficult. It is necessary to strictly manage the pressure loss in the fuel gas channel 40 by improving the accuracy in fabricating the fuel gas channel 40.

In contrast, in the first embodiment, the pressure loss in the fuel gas channel 40 is relatively small in comparison with the pressure loss in the fuel gas supply unit 32. Thus, the uneven pressure loss in each of the sandwiching sections 36 does not affect the pressure loss in the fuel gas supply unit 32, so that the fuel gas is supplied uniformly, making it possible to reduce the number of steps of fabricating the fuel gas supply unit 32.

The protrusion 46 which contacts the outer edge of the anode 24 is provided on the surface 36a of the sandwiching section 36. Therefore, it is possible to prevent oxidation due to the entry of the exhaust gas or the oxygen-containing gas into the anode 24 from the outside of the electrolyte electrode assembly 26. Accordingly, it is possible to prevent the power generation efficiency from being lowered due to oxidation, and improve durability of the separators 28 and the electrolyte electrode assemblies 26.

Further, the projections 48 provided on the sandwiching section 36 protrude on the side of the fuel gas channel 40, and contact the anode 24. By the projections 48, the desired power collection efficiency is achieved.

The consumed fuel gas supplied to the fuel gas channel 40 is discharged from the fuel gas discharge channel 42 to the oxygen-containing gas supply passage 74 in the direction indicated by the arrow C. Thus, in the oxygen-containing gas supply passage 74, the fuel gas in the exhaust gas after consumption in the power generation reacts with part of the oxygen-containing gas before consumption in the power generation. As a result, the rest of the oxygen-containing gas before consumption is heated beforehand. Thus, it is possible to supply the oxygen-containing gas heated beforehand to the oxygen-containing gas channel 70, and improvement in the heat efficiency is achieved.

Further, the fuel gas supply unit 32 is provided hermetically inside the oxygen-containing gas supply passage 74. In the structure, the fuel gas supply unit 32 is not exposed to the exhaust gas directly, and improvement in the durability is achieved.

The air supplied to the oxygen-containing gas supply passage 74 flows into the space between the inner circumferential edge of the electrolyte electrode assembly 26 and the inner circumferential edge of the sandwiching section 36 in the direction indicated by the arrow B. The oxygen-containing gas is supplied to the oxygen-containing gas channel 70 formed in the mesh member 72. In the oxygen-containing gas channel 70, the air flows from the inner circumferential edge of the cathode 22 (center of the separator 28) to the outer circumferential edge of the cathode 22 (outer circumferential edge of the separator 28).

Thus, in the electrolyte electrode assembly 26, the fuel gas flows from the center to the outer circumferential side on the electrode surface of the anode 24, and the oxygen-containing gas flows in one direction indicated by the arrow B on the electrode surface of the cathode 22. At this time, oxygen ions flow through the electrolyte 20 toward the anode 24 for generating electricity by electrochemical reactions.

The air after power generation reaction and the fuel gas after power generation reaction discharged from the outer circumferential region of each of the electrolyte electrode assemblies 26 flow into the exhaust gas channel 78 as the off gas, and is discharged from the fuel cell stack 12 (see FIG. 1).

Figure 6:
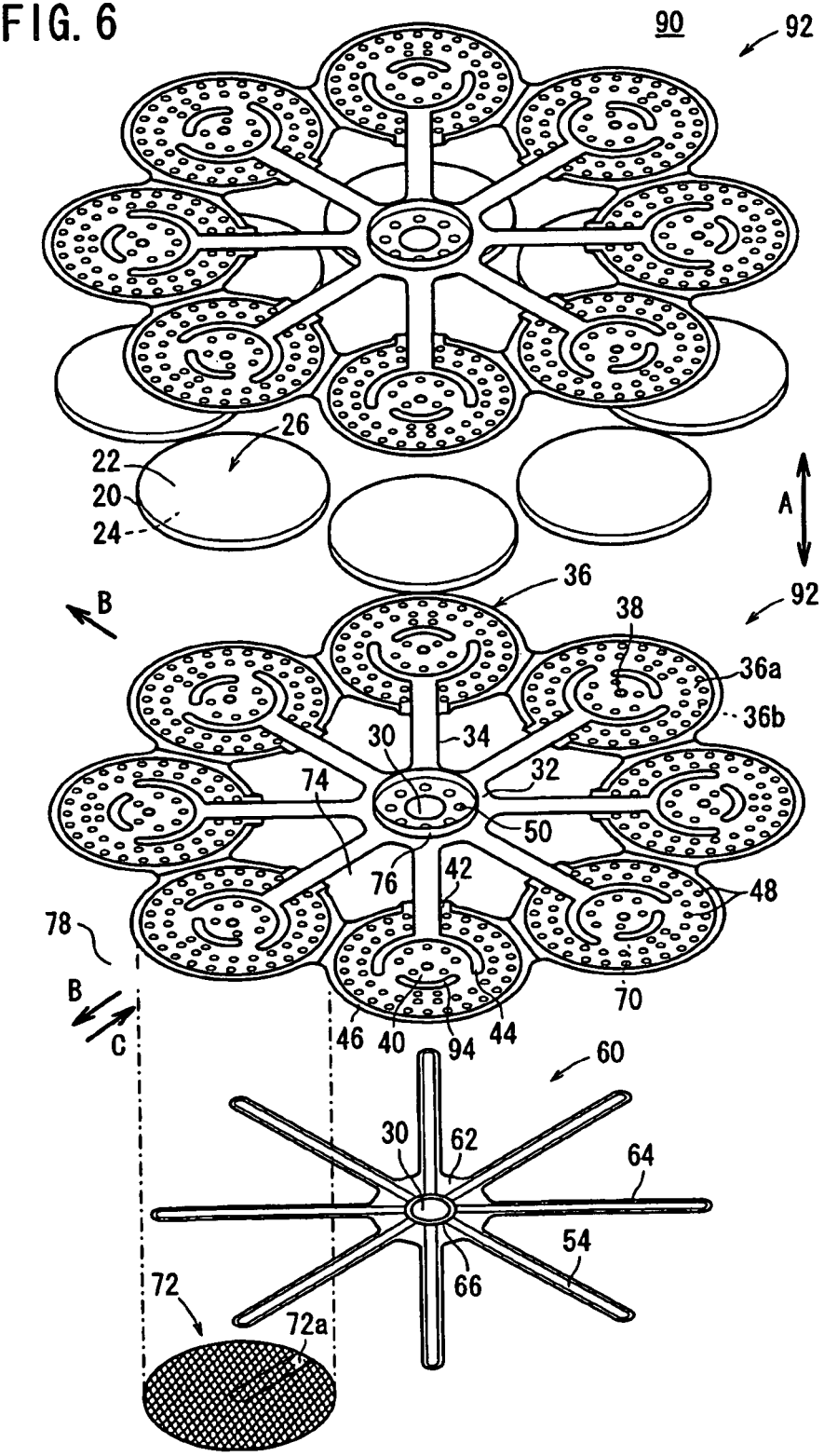
FIG. 6 is an exploded perspective view showing a fuel cell according to a second embodiment of the present invention.

FIG. 6 is an exploded perspective view showing a fuel cell 90 according to a second embodiment of the present invention.

The constituent elements that are identical to those of the fuel cell 10 according to the first embodiment are labeled with the same reference numeral, and description thereof will be omitted. Also in third to tenth embodiments as described later, the constituent elements that are identical to those of the fuel cell 10 according to the first embodiment are labeled with the same reference numeral, and description thereof will be omitted.

The fuel cell 90 has a separator 92, and another circular arc wall 94 is provided at an open end of the circular arc wall 44, on the surface 36a of each sandwiching section 36 of the separator 92. The fuel gas inlet 38 is surrounded by the circular arc wall 94 and the circular arc wall 44.

In the second embodiment, the fuel gas inlet 38 is surrounded by the circular arc walls 44, 94. Therefore, in particular, it is possible to supply the fuel gas to the central region of the anode 24 over a long period of time. Accordingly, further improvement in the power generation efficiency is achieved easily.

Figure 7:
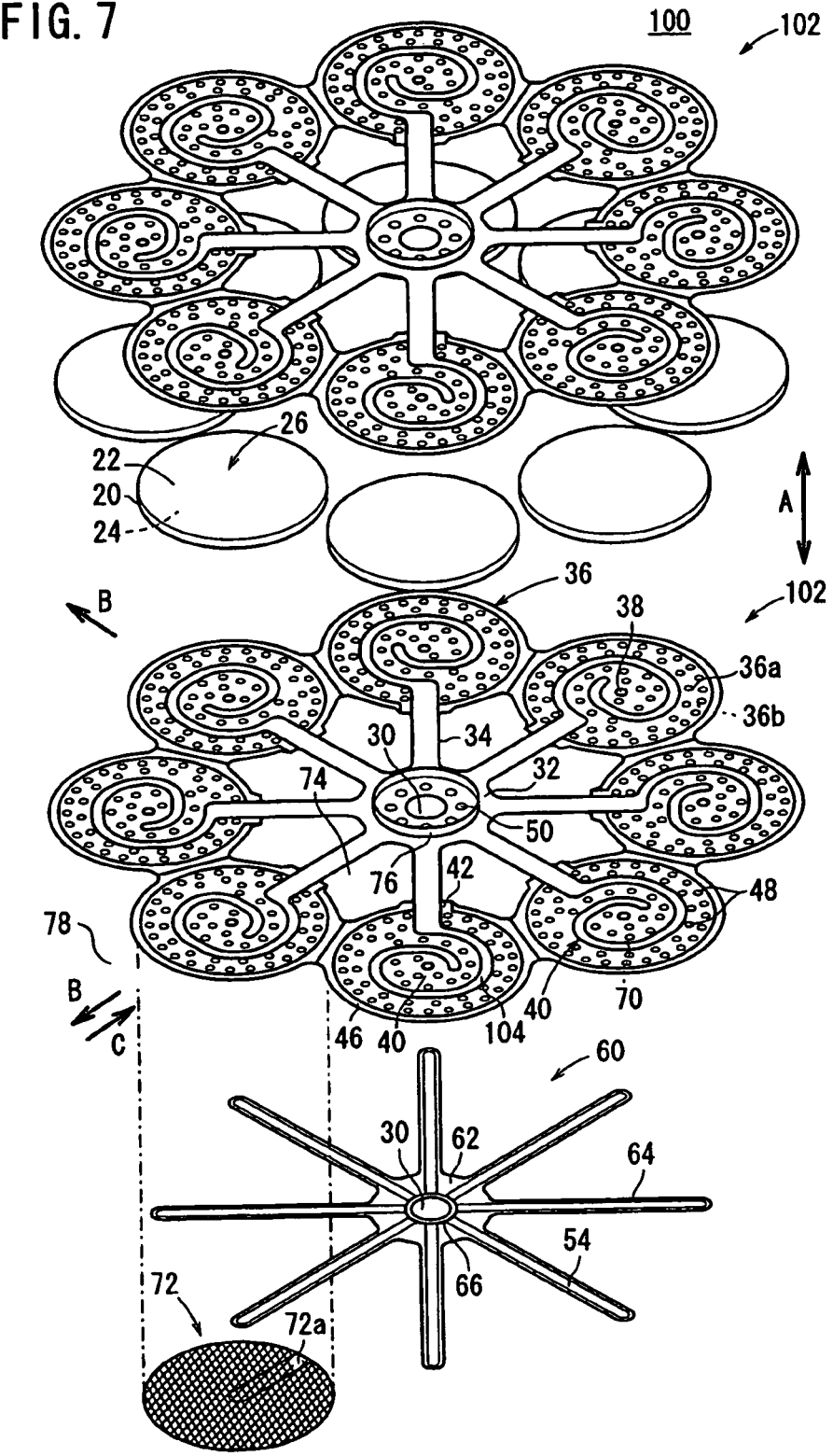
FIG. 7 is an exploded perspective view showing a fuel cell according to a third embodiment of the present invention.

FIG. 7 is an exploded perspective view showing a fuel cell 100 according to a third embodiment of the present invention. The fuel cell 100 has a separator 102, and a spiral wall 104 is provided on a surface 36a of each sandwiching section 36 of the separator 102. A fuel gas inlet 38 is formed near the center of the spiral wall 104. Thus, in the third embodiment, the same advantages as in the case of the first and second embodiments can be obtained.

Figure 8:
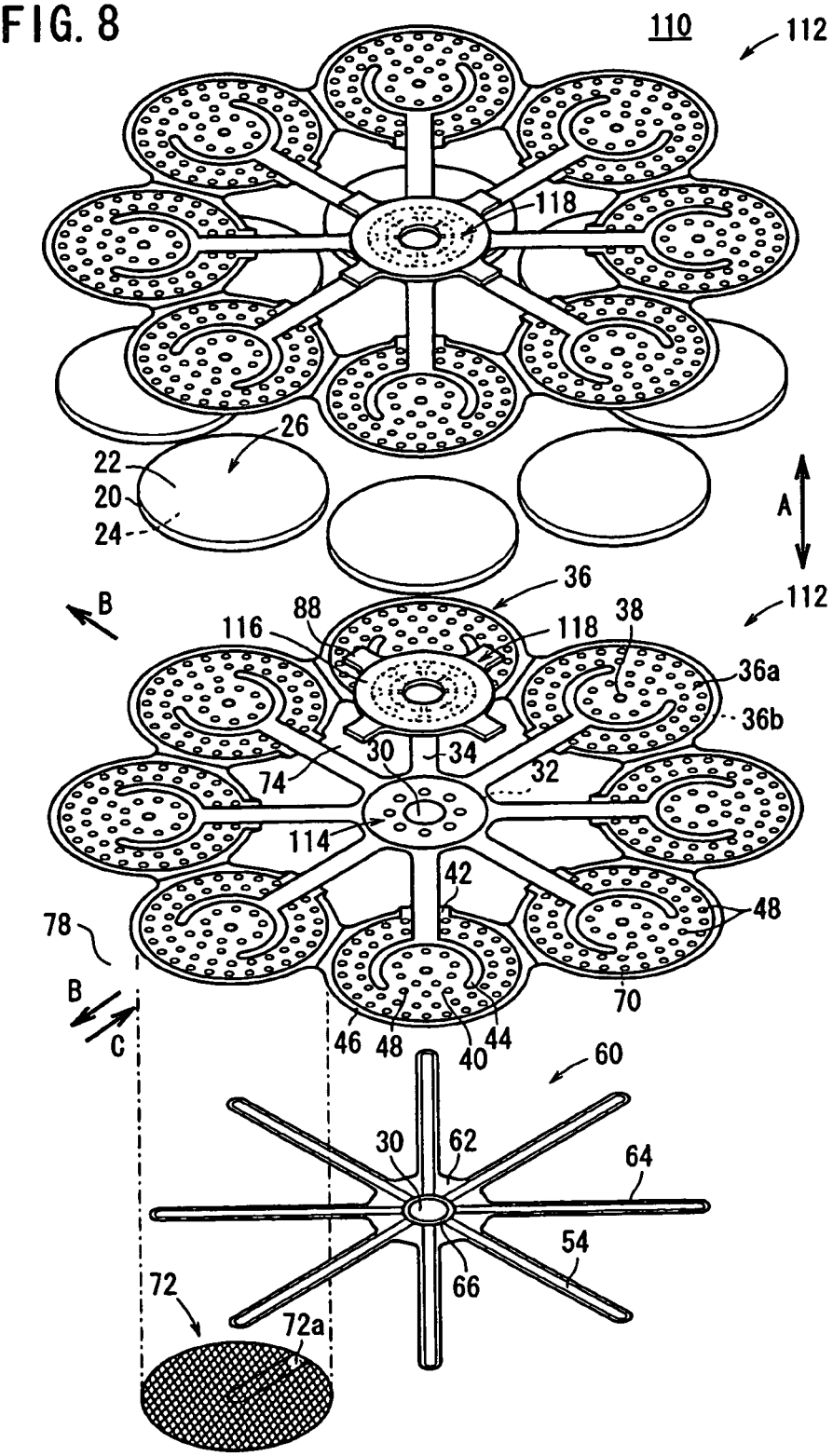
FIG. 8 is an exploded perspective view showing a fuel cell according to a fourth embodiment of the present invention.

FIG. 8 is an exploded perspective view showing a fuel cell 110 according to a fourth embodiment of the present invention. The fuel cell 100 has a separator 112, insulating seals 114, 116 for sealing the fuel gas supply passage 30 provided at the fuel gas supply unit 32 of the separator 112, and a flow path member 118 is detachably provided between the insulating seals 114, 116.

Figure 9:
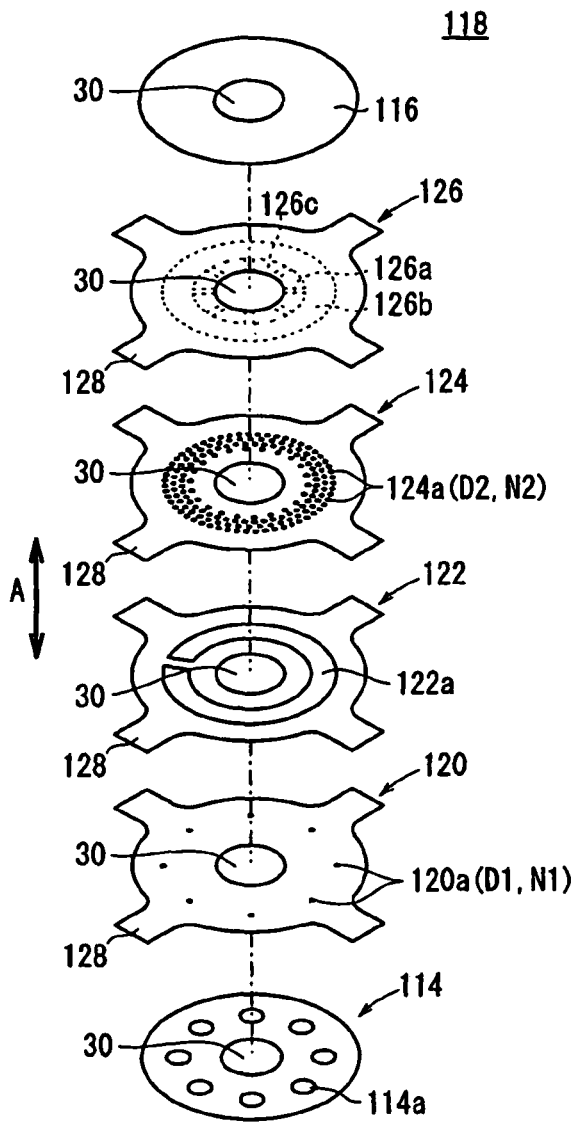
FIG. 9 is an exploded perspective view showing a flow path member of the fuel cell.

As shown in FIG. 9, the flow path member 118 includes an orifice section 120 on the insulating seal 114. A pressure regulating section 122, a filter section 124, and a distribution section 126 are stacked on the orifice section 120. The pressure regulating section 122, the filter section 124, and the distribution section 126 are formed integrally with the orifice section 120 by diffusion bonding, laser welding, or the like. Each of the orifice section 120, the pressure regulating section 122, the filter section 124, and the distribution section 126 is a metal thin plate having a circular disk shape, and has at least one, e.g., four extensions 128 expanding outwardly.

In the orifice section 120, eight orifice holes 120a corresponding to the respective fuel gas supply channels 54 are formed, for reducing the flow rate of the fuel gas supplied from the fuel gas supply passage 30 to the fuel gas supply channels 54.

In the pressure regulating section 122, a pressure regulating chamber 122a comprising a partially closed substantially ring shaped opening is provided around the fuel gas supply passage 30.

In the filter section 124, a plurality of filter holes 124a are provided around the fuel gas supply passage 30, for filtering the fuel gas supplied from the fuel gas supply passage 30 to the fuel gas supply channel 54.

In the distribution section 126, on the surface facing the filter section 124, a plurality of distribution grooves 126a for distributing the fuel gas supplied from the fuel gas supply passage 30 to the filter section 124 are formed. The distribution grooves 126a are connected to a circular groove 126b, and the circular groove 126b is connected to the plurality of filter holes 124a provided in the filter section 124. Protrusions 126c are provided between the distribution grooves 126a for preventing closure of the distribution grooves 126a by the tightening load.

Figure 10:
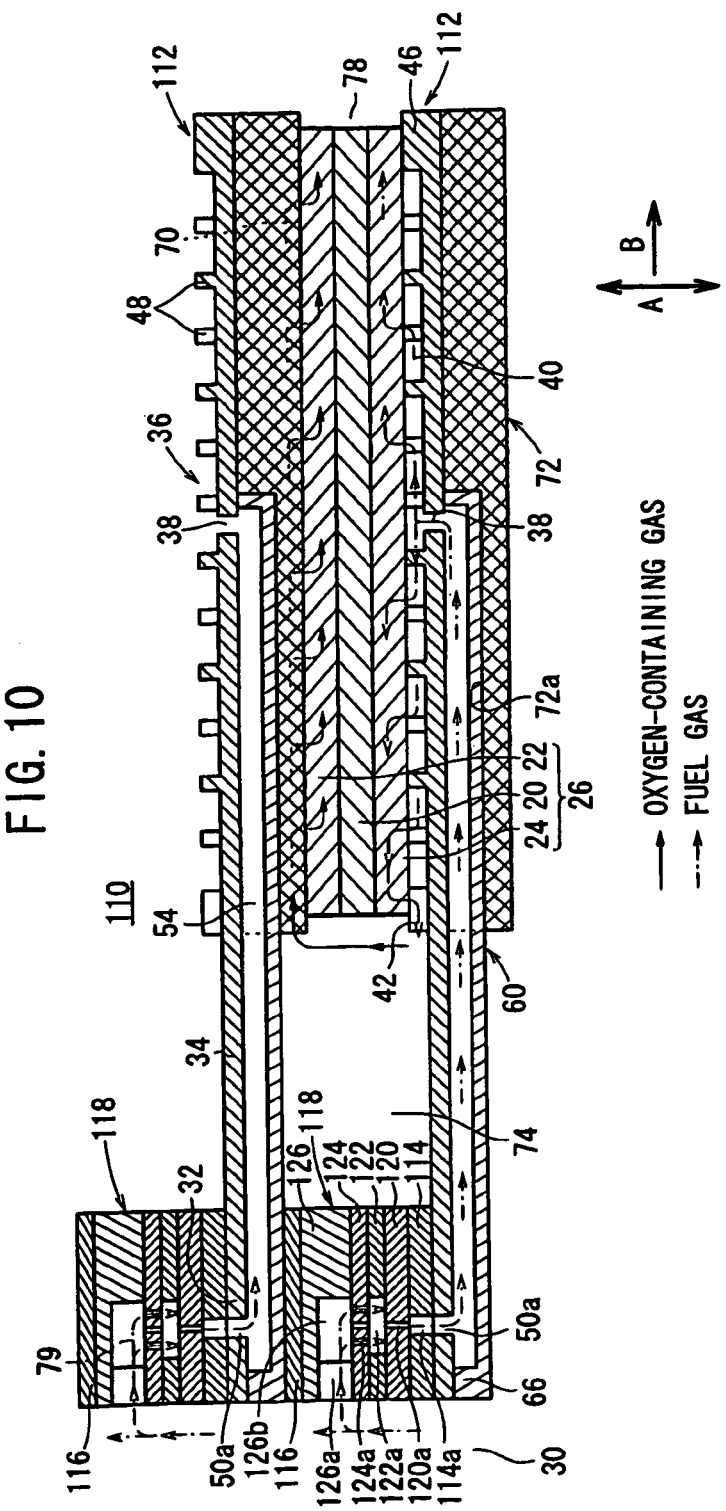
FIG. 10 is a cross sectional view schematically showing operation of the fuel cell.

In the flow path member 118, the pressure regulating chamber 122a is provided at a position connecting the orifice holes 120a and the filter holes 124a. The inner diameter D1 of the orifice hole 120a is larger than the inner diameter D2 of the filter hole 124a (D1>D2), and the number N1 of the orifice holes 120a is smaller than the number N2 of the filter holes 124a (N1<N2). In practice, the number N1 of the orifice holes 120a is eight. As shown in FIG. 10, the inner diameter D1 of the orifice holes 120a is smaller than the inner diameter of the fuel gas inlet 38.

In the fourth embodiment, the fuel gas flows along the fuel gas supply passage 30 in the stacking direction indicated by the arrow A, and is supplied to the flow path member 118 in each of the fuel cells 110. As shown in FIG. 10, the fuel gas moving through the fuel gas supply passage 30 in the flow path member 118 partially flows into the distribution grooves 126a of the distribution section 126, toward the circular groove 126b.

The circular groove 126b is connected to the filter holes 124a provided in the filter section 124. Thus, the fuel gas flows from the circular groove 126b to the pressure regulating chamber 122a of the pressure regulating section 122 through the filter hole 124a.

After the pressure of the fuel gas is regulated in the pressure regulating chamber 122a, the fuel gas flows through the orifice holes 120a provided in the orifice section 120. Then, the fuel gas flows through the holes 114a of the insulating seal 114, and the holes 50a to the fuel gas supply channel 54. Thus, the fuel gas flows along the fuel gas supply channel 54 along the surface of the separator 112 in the direction indicated by the arrow B.

In the fourth embodiment, the circular arc wall 44 is used, and the same advantages as in the case of the first embodiment can be obtained. In the fourth embodiment, wall structure of the second embodiment or the third embodiment may be adopted.

Figure 11:
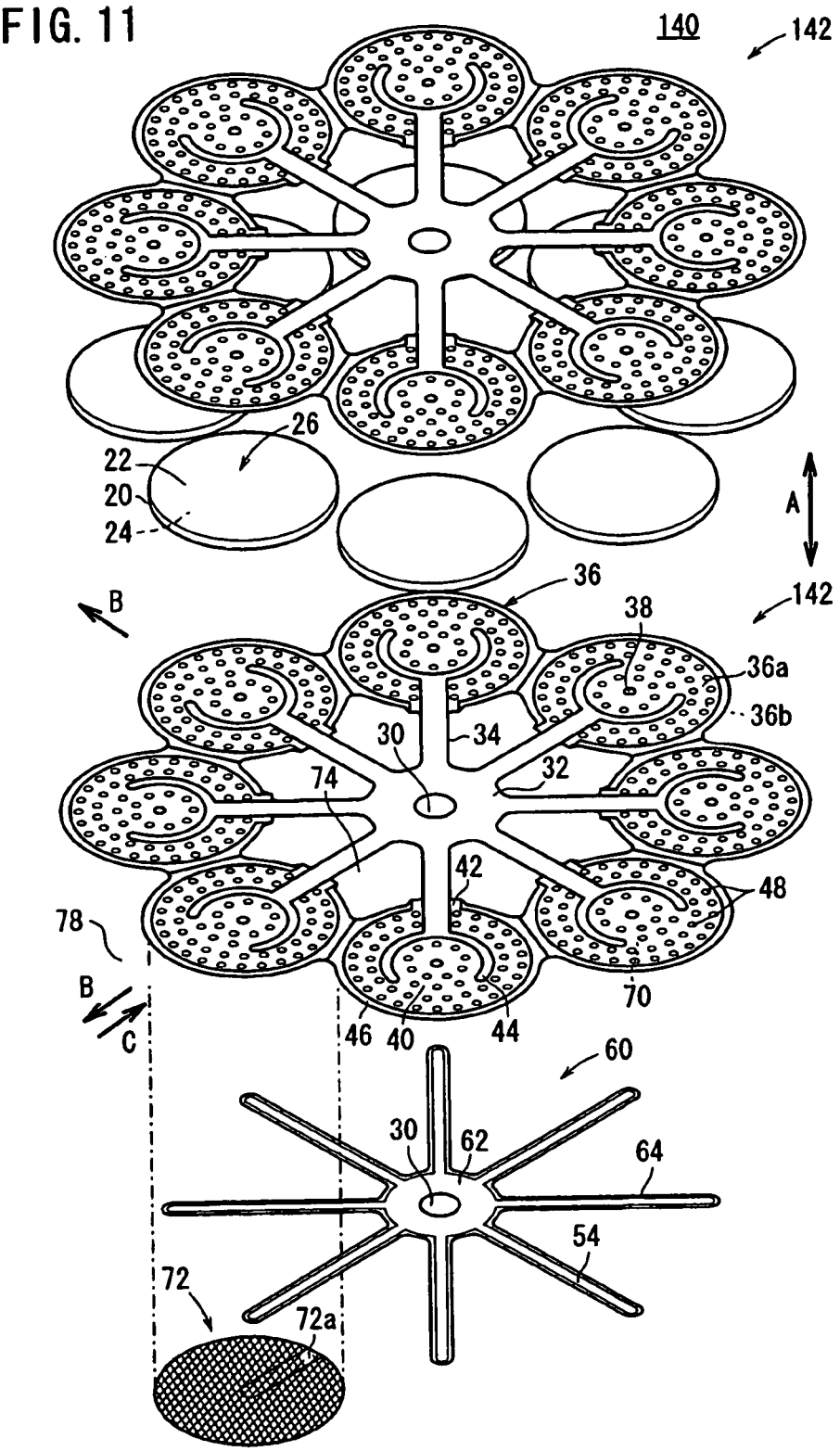
FIG. 11 is an exploded perspective view showing a fuel cell according to a fifth embodiment of the present invention.
Figure 12:
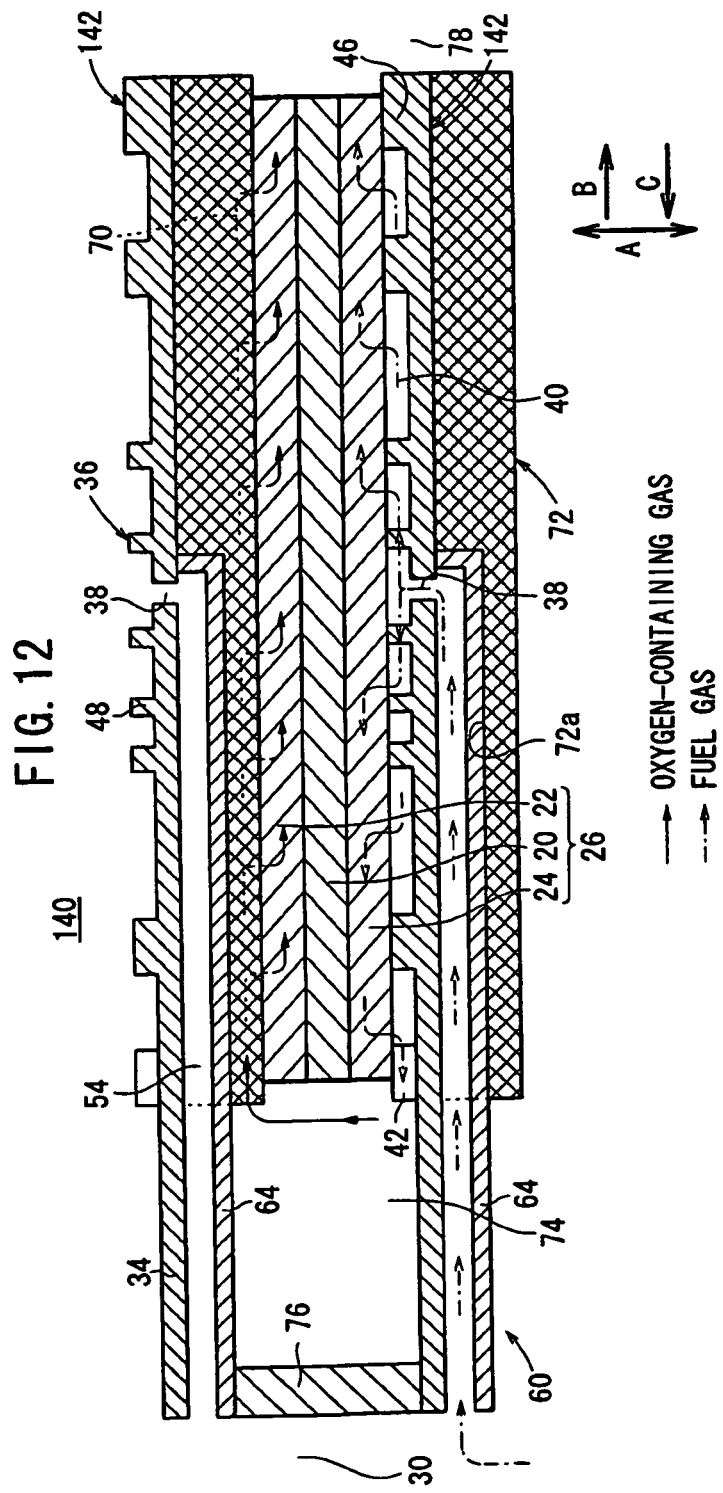
FIG. 12 is a cross sectional view showing operation of the fuel cell.

FIG. 11 is an exploded perspective view showing a fuel cell 140 according to a fifth embodiment of the present invention. FIG. 12 is a cross sectional view showing the fuel cell 140.

The fuel cell 140 has a separator 142, and a fuel gas supply passage 30 extends through a fuel gas supply unit 32 of the separator 142. A fuel gas supply channel 54 is directly connected over the fuel gas supply unit 32 and the first bridge 34.

In the fuel cell 140, as shown in FIG. 12, after the fuel gas flows through the fuel gas supply passage 30, the fuel gas flows into the fuel gas supply channel 54 formed between the separator 142 and the channel member 60. Then, the fuel gas is supplied to the fuel gas channel 40 from the fuel gas inlet 38.

In the fifth embodiment, though no fuel gas orifice is provided, the heights of the circular arc wall 44, the protrusion 46, and projections 48 are determined such that the pressure loss in the fuel gas channel 40 becomes smaller than the pressure loss of the fuel gas in the fuel gas supply unit 32. Thus, in the fifth embodiment, the same advantages as in the cases of the first to fourth embodiments can be obtained.

Figure 13:
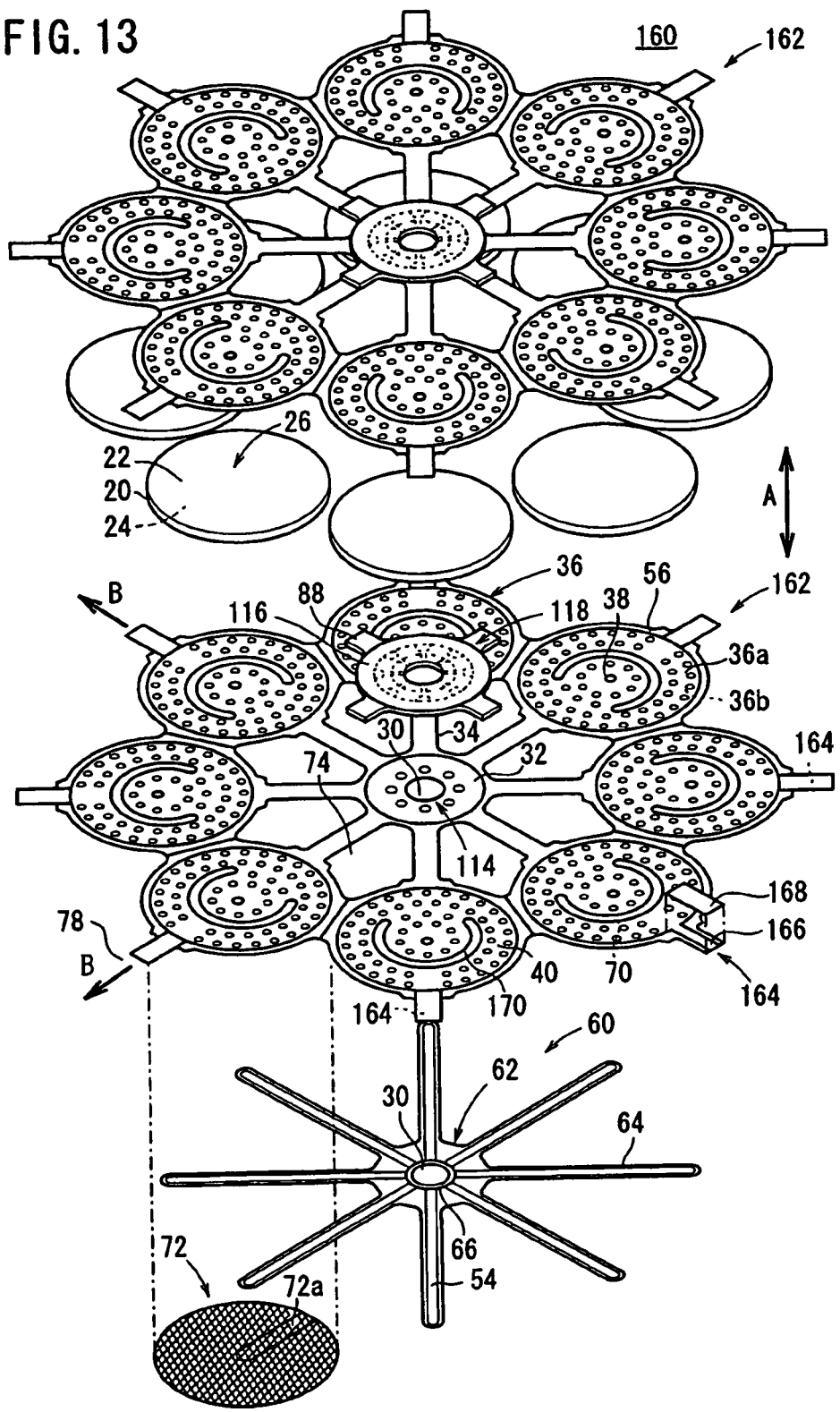
FIG. 13 is an exploded perspective view showing a fuel cell according to a sixth embodiment of the present invention.
Figure 14:
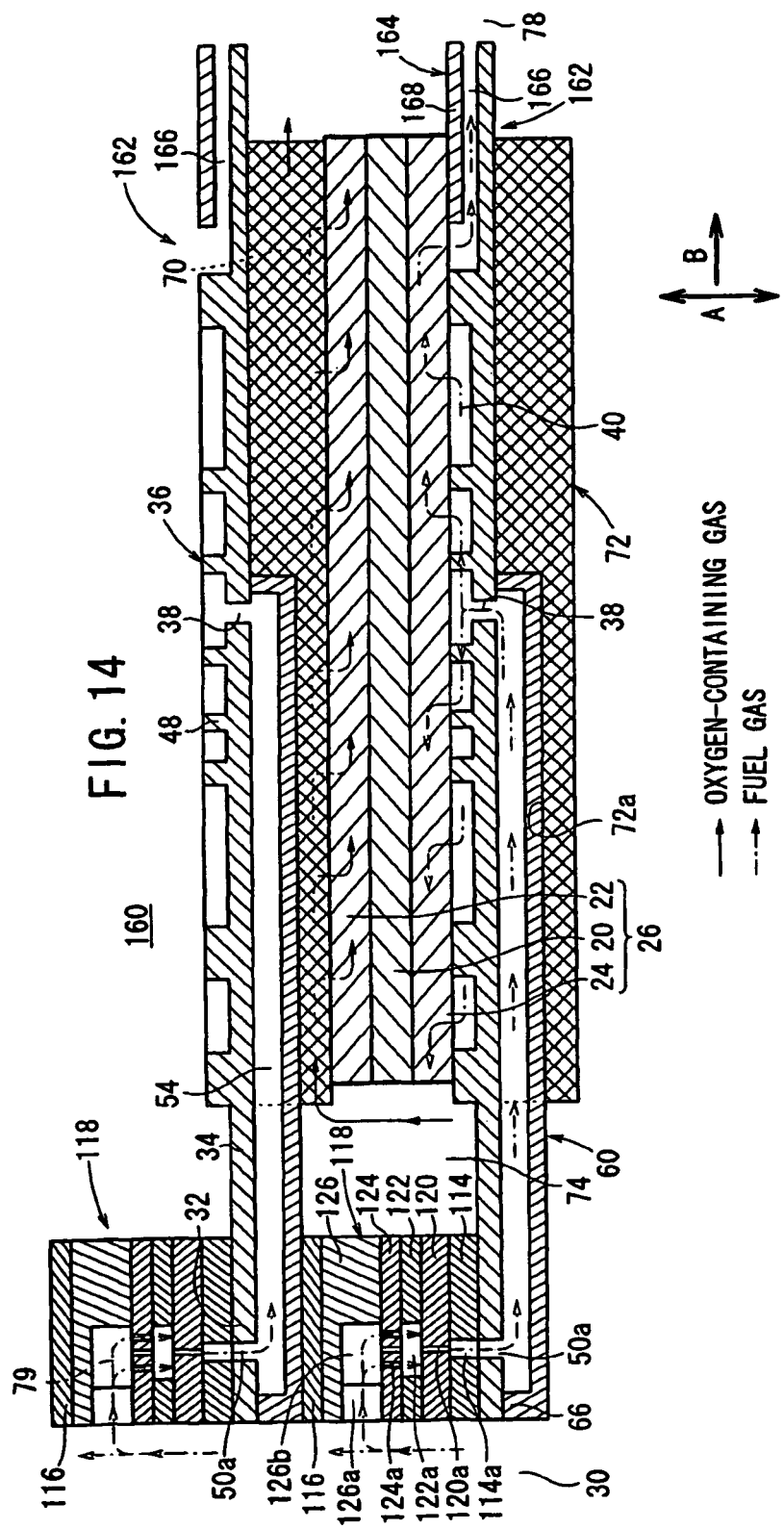
FIG. 14 is a cross sectional view schematically showing operation of the fuel cell.

FIG. 13 is an exploded perspective view showing a fuel cell 160 according to a sixth embodiment of the present invention. FIG. 14 is a cross sectional view showing the fuel cell 160.

The fuel cell 160 has a separator 162 including sandwiching sections 36, and fuel gas discharge channels 164. The fuel gas discharge channel 164 protrudes from the surface 36a of each sandwiching section 36 in a direction opposite to the first bridge 34. The fuel gas discharge channel 164 includes a discharge groove 166 and a lid member 168. The discharge groove 166 extends radially outwardly from the outer circumferential region of the sandwiching section 36, and the lid member 168 covers the discharge groove 166. The fuel gas discharge channel 164 is opened to the exhaust gas channel 78 at a position protruding outwardly from the outer circumferential region of the electrolyte electrode assembly 26 by a predetermined distance.

A circular arc wall 170 is provided between the fuel gas inlet 38 and the fuel gas discharge channel 164. The circular arc wall 170 prevents the fuel gas from flowing straight from the fuel gas inlet 38 to the fuel gas discharge channel 164.

In the fuel cell 160, as shown in FIG. 14, the fuel gas flowing along the fuel gas supply passage 30 in the stacking direction is supplied to the flow path member 118, and the fuel gas is supplied to the fuel gas supply channel 54 through the flow path member 118. Further, the fuel gas flows through the fuel gas supply channel 54 in the direction indicated by the arrow B, and then, the fuel gas is supplied to the fuel gas channel 40 from the fuel gas inlet 38.

As shown in FIG. 13, in the fuel gas channel 40, the circular arc wall 170 is formed between the fuel gas inlet 38 and the fuel gas discharge channel 164. Thus, the fuel gas supplied to the fuel gas channel 40 is blocked by the circular arc wall 170, and the fuel gas does not flow straight from the fuel gas inlet 38 to the fuel gas discharge channel 164. The fuel gas is supplied suitably along the anode 24.

Thus, in the sixth embodiment, the same advantages as in the cases of the first to fifth embodiments can be obtained. Further, the fuel gas discharge channel 164 is opened to the exhaust gas channel 78 at a position spaced from the outer circumferential region of the electrolyte electrode assembly 26. In the structure, the position where the fuel gas and the oxygen-containing gas after consumption are mixed is remote from the electrolyte electrode assembly 26. Thus, the durability of the electrolyte electrode assembly 26 and the separator 162 is improved advantageously.

Further, since combustion of the fuel gas and the oxygen-containing gas after consumption is induced in the exhaust gas channel 78, it is possible to further heat the exhaust gas, and improvement in the heat efficiency, e.g., at the time of utilizing the exhaust gas again is achieved easily.

In the sixth embodiment, the flow path member 118 (fourth embodiment) is used. However, the present invention is not limited in this respect. For example, structure of the first embodiment where the fuel gas orifice 50 is provided or structure of the fifth embodiment where the fuel gas orifice 50 is not provided can be adopted. Likewise, in seventh to tenth embodiments, structure of the first embodiment or structure of the fifth embodiment can be adopted arbitrarily.

Figure 15:
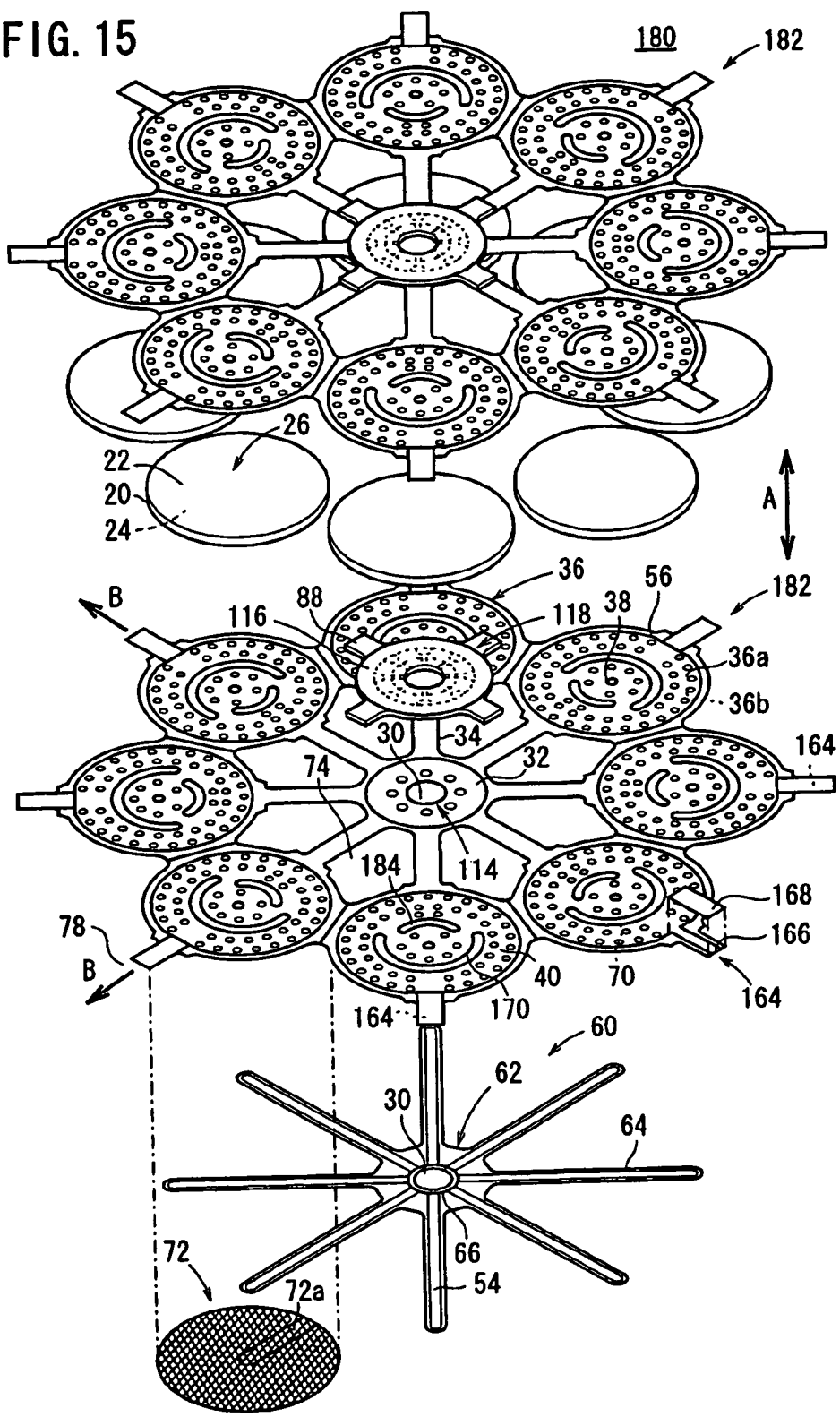
FIG. 15 is an exploded perspective view showing a fuel cell according to a seventh embodiment of the present invention.

FIG. 15 is an exploded perspective view showing a fuel cell 180 according to a seventh embodiment of the present invention.

The fuel cell 180 includes a separator 182, and another circular arc wall 184 is provided on the open end side of a circular arc wall 170, on a surface 36a of each sandwiching section 36 of the separator 182. The fuel gas inlet 38 is surrounded by the circular arc wall 184 and the circular arc wall 170.

Figure 16:
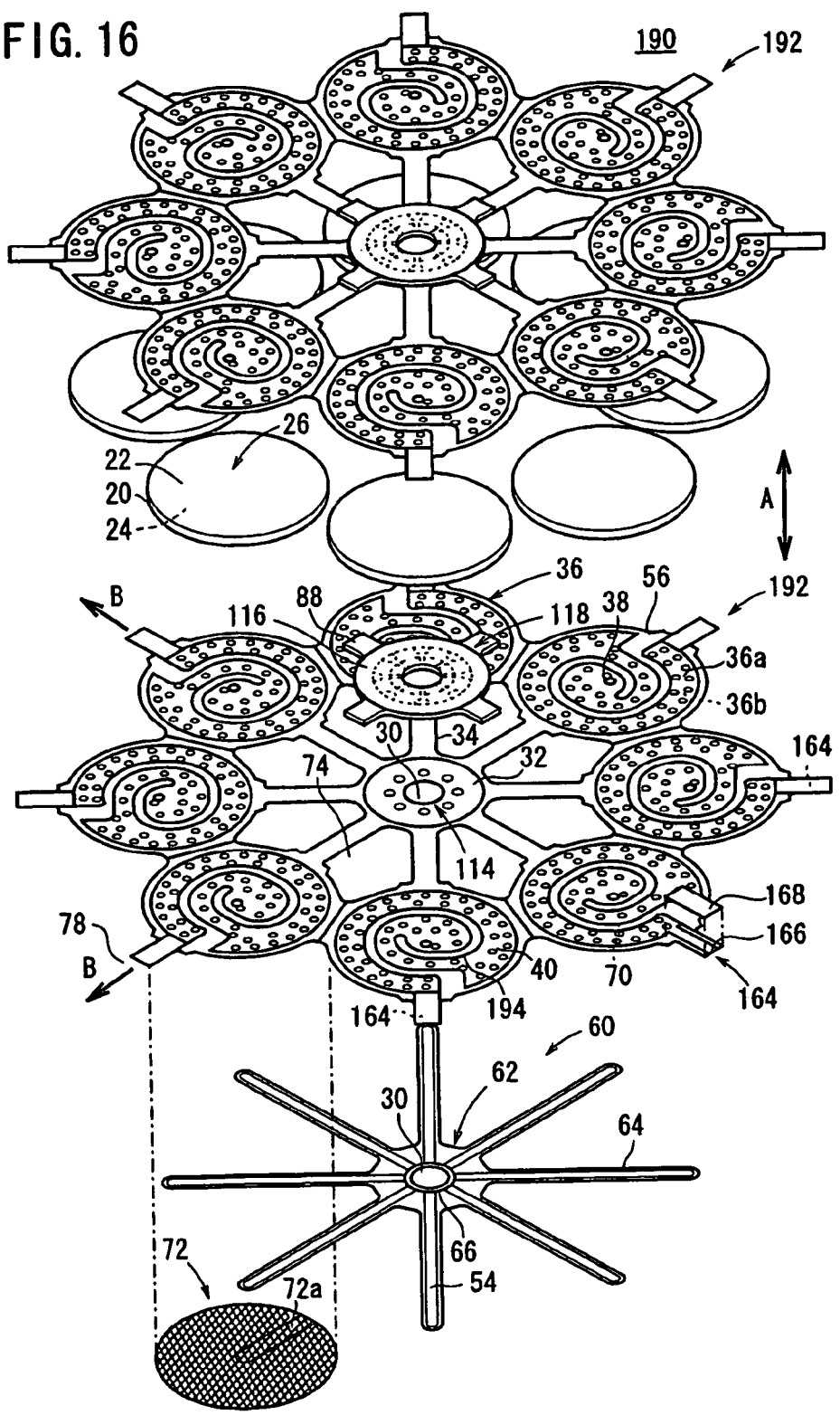
FIG. 16 is an exploded perspective view showing a fuel cell according to an eighth embodiment of the present invention.

FIG. 16 is an exploded perspective view showing a fuel cell 190 according to an eighth embodiment of the present invention. The fuel cell 190 has a separator 192, and a spiral wall 194 is provided on a surface 36a of each sandwiching section 36 of the separator 192.

In the seventh and eighth embodiments, the fuel gas flows through the fuel gas channel 40 over the large distance, and the same advantages as in the case of the sixth embodiment can be obtained.

In the first to eighth embodiments, eight electrolyte electrode assemblies 26 are arranged along a virtual circle, and the oxygen-containing gas is supplied from the inner region to the outer circumferential region in the direction indicated by the arrow B. Alternatively, the fuel cell stack may have the structure in which the oxygen-containing gas is supplied from the outer circumferential region to the inner region in the direction indicated by the arrow C.

Figure 17:
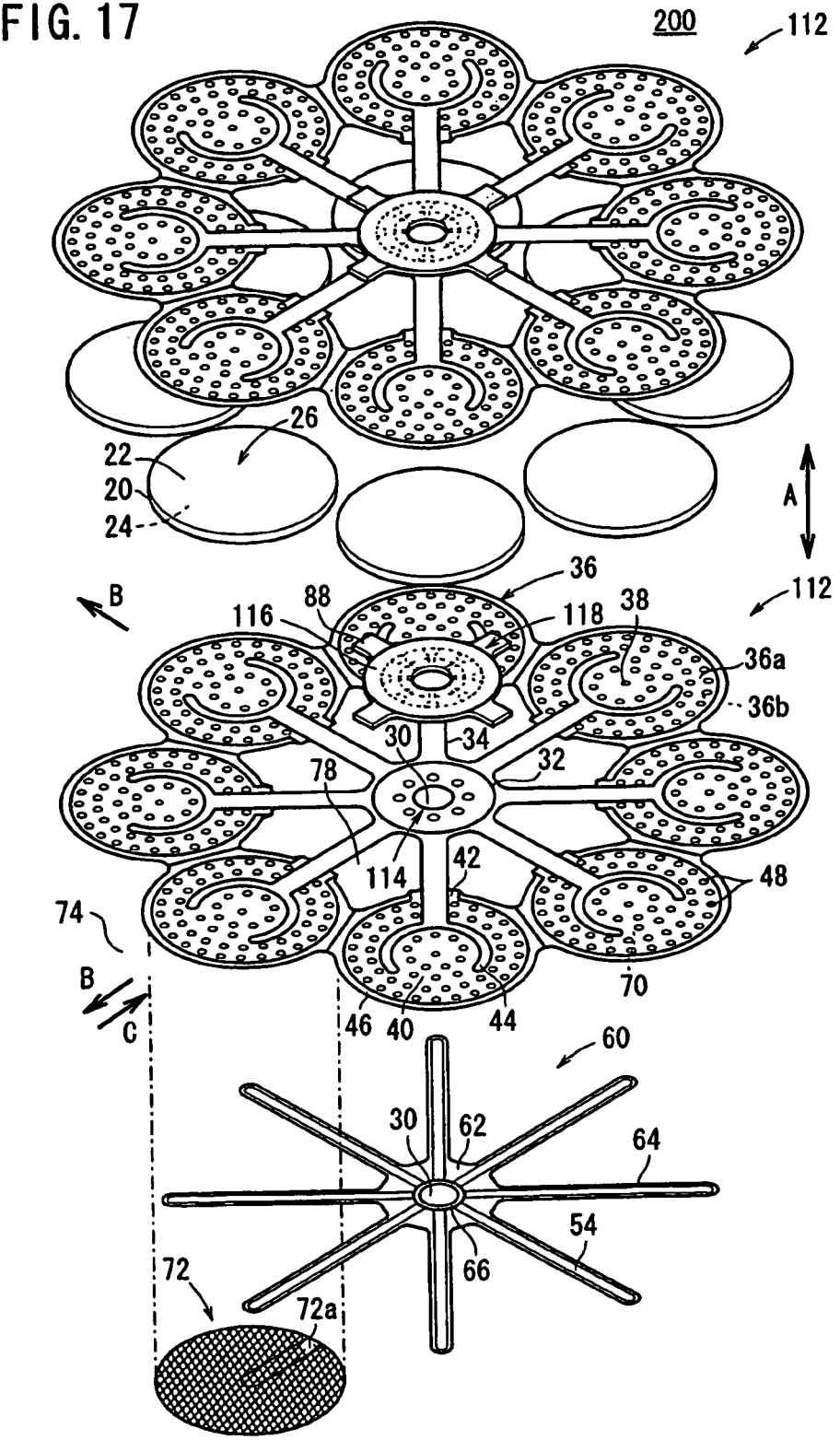
FIG. 17 is an exploded perspective view showing a fuel cell according to a ninth embodiment of the present invention.

For example, as shown in FIG. 17, in a fuel cell according to a ninth embodiment (same structure as in the case of the fourth embodiment), the exhaust gas channel 78 extending inside the sandwiching sections 36 between the first bridges 34 is provided. An oxygen-containing gas supply passage 74 is provided around the sandwiching sections 36. The oxygen-containing gas supply passage 74 extends in the direction indicated by the arrow C toward the inside of the separator 112.

In the ninth embodiment, the fuel gas supply unit 32 is provided inside the exhaust gas channel 78. In the structure, the fuel gas before consumption is heated beforehand by the exhaust gas flowing through the exhaust gas channel 78. Thus, the heat is collected suitably, and improvement in the heat efficiency is achieved easily.

Figure 18:
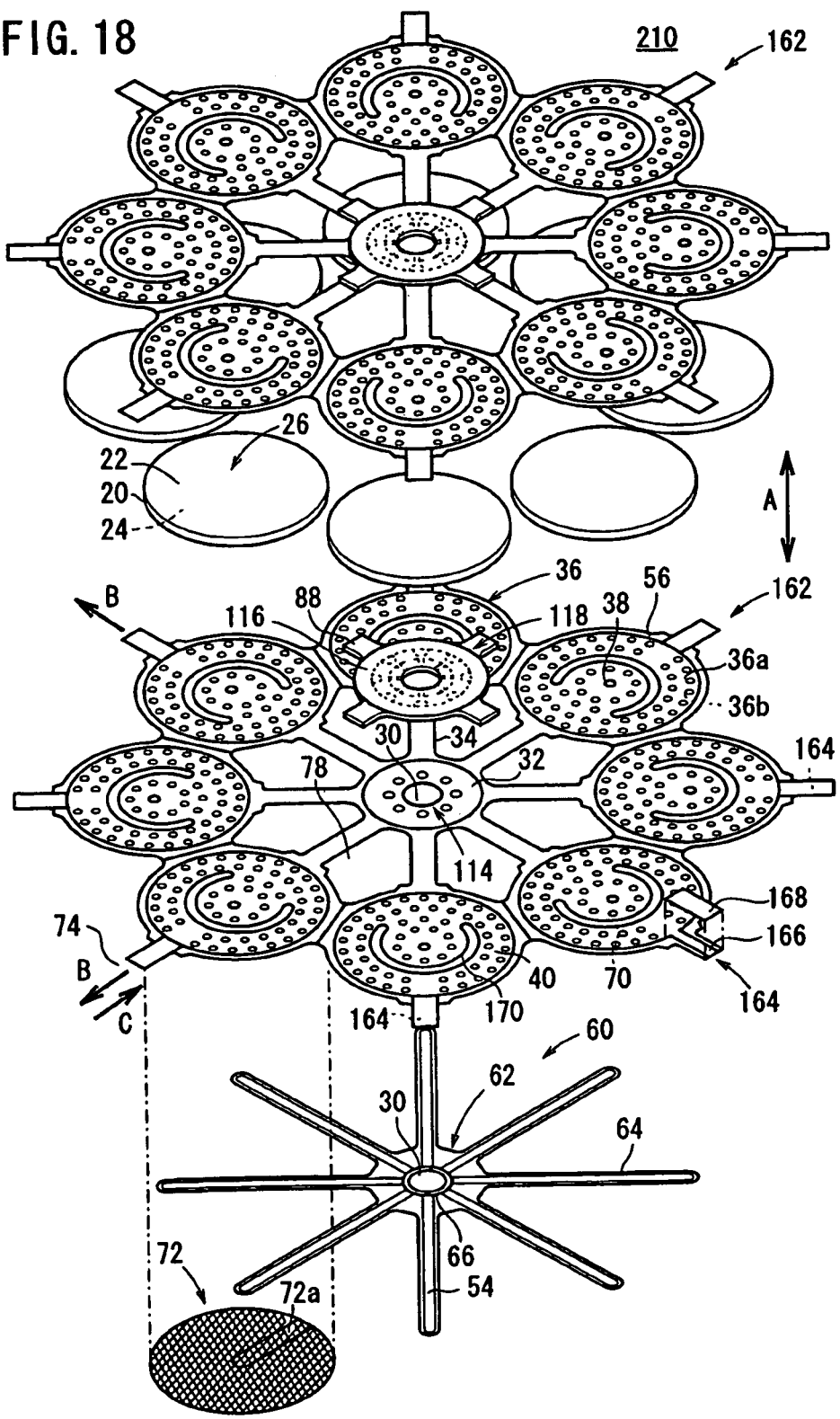
FIG. 18 is an exploded perspective view showing a fuel cell according to a tenth embodiment of the present invention.
Figure 19:
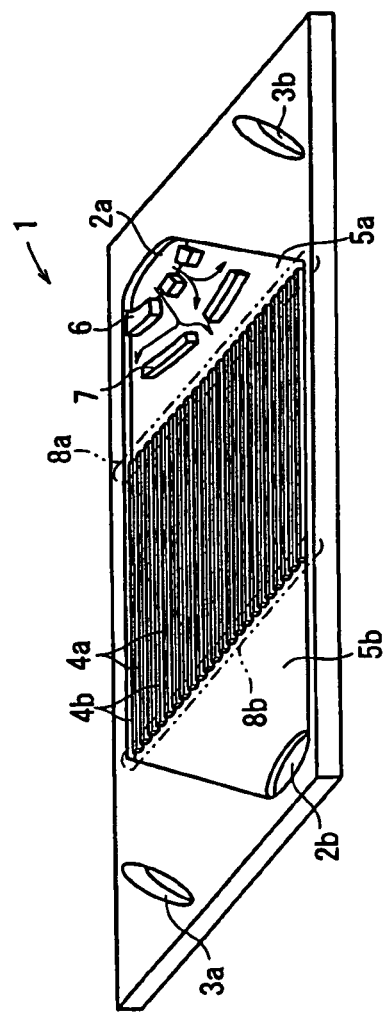
FIG. 19 is a view showing a separator of a conventional fuel cell.

As shown in FIG. 18, in a fuel cell 210 according to a tenth embodiment (same structure as in the case of the sixth embodiment), the exhaust gas channel 78 is provided inside the sandwiching sections 36, between the first bridges 34, and the oxygen-containing gas supply passage 74 is provided around the sandwiching sections 36. In the structure, the consumed fuel gas discharged from the fuel gas discharge channel 164 to the oxygen-containing gas supply passage 74 is used for heating the oxygen-containing gas before consumption.

The invention claimed is:

1. A fuel cell formed by stacking an electrolyte electrode assembly and separators, said electrolyte electrode assembly comprising an anode, a cathode, and an electrolyte interposed between said anode and said cathode, said electrolyte electrode assembly being sandwiched between said separators, said separators each comprising:
    a sandwiching section having a fuel gas channel for supplying a fuel gas along an electrode surface of said anode and an oxygen-containing gas channel for supplying an oxygen-containing gas along an electrode surface of said cathode, separately;
    a bridge connected to said sandwiching section, and having a fuel gas supply channel for supplying the fuel gas to said fuel gas channel;
    a fuel gas supply unit connected to said bridge, a fuel gas supply passage for supplying the fuel gas to said fuel gas supply channel extending through said fuel gas supply unit in a stacking direction; and
    an insulating seal formed around the fuel gas supply passage to seal the fuel gas supply passage from the electrolyte electrode assembly,
    wherein a fuel gas inlet for supplying the fuel gas to said fuel gas channel, an annular protrusion extending along the side of said fuel gas channel and contacting an outer circumferential region of said anode, a fuel gas discharge channel for discharging the fuel gas after consumption in said fuel gas channel, and a detour path forming wall which contacts said anode, for preventing the fuel gas from flowing straight from said fuel gas inlet to said fuel gas discharge channel are provided in said sandwiching section, and
    wherein the annular protrusion has a ring shape with a partial cutaway to form the fuel gas discharge channel.

2. A fuel cell according to claim 1, wherein said sandwiching section includes a plurality of projections protruding on the side of said fuel gas channel to contact said anode.

3. A fuel cell according to claim 2, wherein said fuel gas supply unit has a fuel gas orifice for reducing the flow rate of the fuel gas supplied from a fuel gas supply passage to said fuel gas supply channel, and a diameter of said fuel gas orifice is smaller than a diameter of said fuel gas inlet.

4. A fuel cell according to claim 3, wherein the heights of said detour path forming wall, said projections, and said outer annular protrusion are determined such that the pressure loss of the fuel gas in said fuel gas channel becomes smaller than the pressure loss of the fuel gas in said fuel gas supply unit.

5. A fuel cell according to claim 1, further comprising an exhaust gas channel for discharging the reactant gas supplied to said electrolyte electrode assembly and consumed in reaction as an exhaust gas in the stacking direction of said electrolyte electrode assembly and said separators; and
    an oxygen-containing gas supply passage for allowing the oxygen-containing gas before consumption to flow in the stacking direction.

6. A fuel cell according to claim 5, wherein a fuel gas supply unit is provided hermetically inside said oxygen-containing gas supply passage.

7. A fuel cell according to claim 6, wherein the fuel gas after consumption is discharged through said fuel gas discharge channel to said oxygen-containing gas supply passage.

8. A fuel cell according to claim 6, wherein the fuel gas after consumption is discharged through said fuel gas discharge channel to said exhaust gas channel outside said electrolyte electrode assembly.

9. A fuel cell according to claim 5, wherein a fuel gas supply unit is provided hermetically inside said exhaust gas channel.

10. A fuel cell according to claim 9, wherein the fuel gas after consumption is discharged through said fuel gas discharge channel to said exhaust gas channel.

11. A fuel cell according to claim 9, wherein the fuel gas after consumption is discharged through said fuel gas discharge channel to said oxygen-containing gas supply passage outside said electrolyte electrode assembly.

* * * * *